(12) United States Patent
Osawa et al.

(10) Patent No.: US 9,364,904 B2
(45) Date of Patent: Jun. 14, 2016

(54) VARIABLE LEAD END MILL

(75) Inventors: Jiro Osawa, Toyokawa (JP); Tasuku Itoh, Toyokawa (JP); Shigetoshi Ukei, Toyokawa (JP); Hiroshi Tomita, Toyokawa (JP)

(73) Assignee: OSG Corporation, Toyokawa-shi (JP)

( * ) Notice: Subject to any disclaimer, the term of this patent is extended or adjusted under 35 U.S.C. 154(b) by 270 days.

(21) Appl. No.: 14/128,292

(22) PCT Filed: Jul. 5, 2011

(86) PCT No.: PCT/JP2011/065381
§ 371 (c)(1),
(2), (4) Date: Dec. 20, 2013

(87) PCT Pub. No.: WO2013/005307
PCT Pub. Date: Jan. 10, 2013

(65) Prior Publication Data
US 2014/0119844 A1    May 1, 2014

(51) Int. Cl.
*B23C 5/10*    (2006.01)

(52) U.S. Cl.
CPC ........... *B23C 5/10* (2013.01); *B23C 2210/0492* (2013.01); *B23C 2210/204* (2013.01); *B23C 2210/241* (2013.01); *B23C 2210/282* (2013.01); *B23C 2210/405* (2013.01);
(Continued)

(58) Field of Classification Search
CPC ................. B23C 2210/248; B23C 2210/0485; B23C 2210/0492; B23C 2210/282; B23C 2210/321; B23C 2210/325; B23C 2210/402; B23C 2210/405; B23C 2210/407; B23C 2210/445; B23B 51/08; B23B 2251/046; Y10T 407/1946; Y10T 407/1948; Y10T 407/195; Y10T 407/1958; Y10T 407/196; Y10T 407/1962; Y10T 407/1966; Y10T 408/868; Y10T 408/899; Y10T 408/909; Y10T 408/9095; Y10T 408/905; Y10T 408/9097
USPC ........ 407/53, 54, 55, 59, 60, 61, 63; 408/188, 408/211, 227, 229, 223, 230
See application file for complete search history.

(56) References Cited

U.S. PATENT DOCUMENTS

| | | | |
|---|---|---|---|
| 4,893,968 A | * | 1/1990 | Levy .......................... B23C 5/10 407/53 |
| 4,963,059 A | | 10/1990 | Hiyama |

(Continued)

FOREIGN PATENT DOCUMENTS

| | | |
|---|---|---|
| CN | 201405114 Y | 2/2010 |
| CN | 101698250 A | 4/2010 |

(Continued)

OTHER PUBLICATIONS

Sep. 2, 2014 Office Action issued in Japanese Patent Application No. 2013-522645 (with translation).
(Continued)

*Primary Examiner* — Daniel Howell
*Assistant Examiner* — Nicole N Ramos
(74) *Attorney, Agent, or Firm* — Oliff PLC

(57) ABSTRACT

A variable lead end mill has a plurality of peripheral cutting edges with different helix angles, the variable lead end mill having a flute bottom diameter of a plurality of helix flutes making up rake faces of the plurality of the peripheral cutting edges, the flute bottom diameter increasing in an axial direction from a tool tip toward a shank.

14 Claims, 10 Drawing Sheets

(52) U.S. Cl.
CPC ..... *Y10T 407/1946* (2015.01); *Y10T 407/1948* (2015.01); *Y10T 407/1954* (2015.01)

(56) References Cited

U.S. PATENT DOCUMENTS

| | | | |
|---|---|---|---|
| 6,742,968 B1 * | 6/2004 | Volokh | B23C 5/10 407/34 |
| 6,991,409 B2 * | 1/2006 | Noland | B23C 5/10 407/59 |
| 7,594,783 B2 * | 9/2009 | Reinharz | B23C 5/10 407/42 |
| 7,927,046 B2 * | 4/2011 | Tanaka | B23C 5/10 407/53 |
| 2004/0120777 A1 | 6/2004 | Noland | |
| 2004/0170480 A1 * | 9/2004 | Kawai | B23C 5/10 407/53 |
| 2005/0117982 A1 | 6/2005 | Dov et al. | |
| 2006/0110225 A1 | 5/2006 | Dov et al. | |
| 2006/0188346 A1 | 8/2006 | Greenwood et al. | |
| 2007/0154272 A1 * | 7/2007 | Wells | B23C 5/10 407/54 |
| 2009/0232610 A1 | 9/2009 | Takagi et al. | |
| 2010/0215447 A1 * | 8/2010 | Davis | B23C 5/10 407/115 |
| 2010/0226726 A1 | 9/2010 | Strasmann | |
| 2011/0013998 A1 * | 1/2011 | Tardivo | B23C 5/10 407/53 |
| 2011/0217132 A1 * | 9/2011 | Wells | B23C 5/10 407/54 |
| 2013/0022416 A1 | 1/2013 | Strasmann | |

FOREIGN PATENT DOCUMENTS

| | | |
|---|---|---|
| CN | 201519790 U | 7/2010 |
| JP | U 6-46816 | 6/1994 |
| JP | H10-151513 A | 6/1998 |
| JP | A 2002-361515 | 12/2002 |
| JP | A 2008-110452 | 5/2008 |
| JP | A 2009-220188 | 10/2009 |
| JP | A 2011-20193 | 2/2011 |
| JP | A 2011-110692 | 6/2011 |
| SU | 631271 A1 | 11/1978 |
| WO | 02/070181 A2 | 9/2002 |

OTHER PUBLICATIONS

Jan. 21, 2015 Search Report issued in European Patent Application No. 11869035.3.

Sep. 27, 2012 Search Report issued in International Patent Application No. PCT/JP2011/065381 (with translation).

Feb. 27, 2015 Office Action issued in Chinese Patent Application No. 201180072065.1.

* cited by examiner

FIG.4(a)
TEST SAMPLES

| No | NUMBER OF FLUTES | PERIPHERAL CUTTING EDGE | SHAPE |
|---|---|---|---|
| 1 | 4 | VARIABLE | CONVENTIONAL PRODUCT |
| 2 | 4 | VARIABLE | LARGE CHIP ROOM |
| 3 | 4 | VARIABLE | LARGE CHIP ROOM + FLUTE TAPER |
| 4 | 5 | VARIABLE | CONVENTIONAL PRODUCT |
| 5 | 5 | VARIABLE | LARGE CHIP ROOM |
| 6 | 5 | VARIABLE | LARGE CHIP ROOM + FLUTE TAPER |

FIG.4(b)
TEST CONDITIONS

| No | WORK MATERIAL | CUTTING METHOD | CUTTING SPEED | FEED SPEED | DEPTH OF CUT | REMARK |
|---|---|---|---|---|---|---|
| 1 | inconel718 (45HRC) | FLUTE CUTTING | $764 min^{-1}$ (30.5m/min) | 153mm/min | ap=VARIED ae=12.7mm | CUTTING AREA |
| 2 | inconel718 (45HRC) | POCKET | $764 min^{-1}$ (30.5m/min) | 153mm/min | ap=6.35mm ae=6.35mm | DURABILITY |
| 3 | inconel718 (45HRC) | SIDE-FACE CUTTING | $764 min^{-1}$ (30.5m/min) | 153mm/min | ap=12.7mm ae=3.81mm | DURABILITY |
| 4 | inconel718 (45HRC) | SIDE-FACE CUTTING | $764 min^{-1}$ (30.5m/min) | 77mm/min | ap=12.7mm ae=3.81mm | DURABILITY |
| 5 | inconel718 (45HRC) | SIDE-FACE CUTTING | $1253 min^{-1}$ (50m/min) | 250mm/min | ap=12.7mm ae=0.635mm | DURABILITY |

FIG.6

| | TEST CONDITIONS | | | |
|---|---|---|---|---|
| | No2 CUTTING DISTANCE (mm) | No3 WEAR AMOUNT (mm) | No4 WEAR AMOUNT (mm) | No5 WEAR AMOUNT (mm) |
| TEST SAMPLES No1 | 1016 (100%) | 0.253 (100%) | 0.218 (100%) | 0.145 (100%) |
| TEST SAMPLES No3 | 1360 (134%) | 0.164 (154%) | 0.185 (118%) | 0.125 (116%) |
| TEST SAMPLES No6 | 1550 (153%) | 0.146 (173%) | — | — |

EFFECT OF HALF TAPER ANGLE $\alpha$ ON FLUTE MACHINING PERFORMANCE

EFFECT OF HALF TAPER ANGLE $\alpha$ ON SIDE-FACE MACHINING PERFORMANCE

VARIABLE LEAD END MILL

TECHNICAL FIELD

The present invention relates to an end mill and particularly to an improvement of a variable lead end mill achieving excellent machining accuracy.

BACKGROUND ART

A variable lead end mill having a plurality of peripheral cutting edges with different helix angles is proposed as a type of an end mill. An end mill described in Patent Document 1 is an example thereof and since circumferential intervals of the plurality of the peripheral cutting edges continuously change, chattering vibrations etc., due to resonance are suppressed and excellent machining accuracy (surface roughness) is achieved.

PRIOR ART DOCUMENT

Patent Document

Patent Document 1: Japanese Laid-Open Patent Publication No. 2008-110452

SUMMARY OF THE INVENTION

Problem to be Solved by the Invention

However, such a conventional variable lead end mill may result in tool breakage at a raised portion of a helix flute when performing high-load processing or high-efficiency processing with deep cutting dimensions.

The present invention was conceived in view of the situations and it is therefore an object of the present invention to improve breakage strength of a variable lead end mill achieving excellent machining accuracy.

Means for Solving the Problem

To achieve the object, the first aspect of the invention provides a variable lead end mill having a plurality of peripheral cutting edges with different helix angles, the variable lead end mill having a flute bottom diameter d of a plurality of helix flutes making up rake faces of the plurality of the peripheral cutting edges, the flute bottom diameter d increasing in an axial direction from a tool tip toward a shank.

The second aspect of the invention provides the variable lead end mill recited in the first aspect of the invention, wherein the peripheral cutting edge has a land consisting only of a peripheral relieving portion (a portion referred as a primary flank).

The third aspect of the invention provides the variable lead end mill recited in the second aspect of the invention, wherein a cross-sectional shape of the helix flute orthogonal to an axial center O on a cutting-edge rear side leading to a heel of the land is defined based on a tangential line C drawn from the heel of the land to a flute bottom circle Q passing through flute bottoms of the plurality of the helix flutes such that a flute wall surface falls within an allowable range E defined with a width dimension of 0.05 D relative to a cutting diameter D on each of both sides of the tangential line C.

The fourth aspect of the invention provides the variable lead end mill recited in any one of the first to third aspects of the invention, wherein the flute bottom diameter d is continuously increased at a half taper angle within a range of 0.5 to 5.5 degrees in the axial direction.

The fifth aspect of the invention provides the variable lead end mill recited in the second or third aspect of the invention, wherein edge thicknesses t are width dimensions of lands in a direction orthogonal to edges of the plurality of the peripheral cutting edges, i.e., the peripheral relieving portions and are equal to each other within a variation range equal to or less than 0.04 D relative to the cutting diameter D and are kept within the variation range over the whole axial length.

The sixth aspect of the invention provides the variable lead end mill recited in any one of the first to fifth aspects of the invention, wherein rake angles γ of the plurality of the peripheral cutting edges are equal to each other within a variation range equal to or less than 3 degrees and are kept within the variation range over the whole axial length.

The seventh aspect of the invention provides the variable lead end mill recited in any one of the first to sixth aspects of the invention, wherein the variable lead end mill has a plurality of end cutting edges continuously from the plurality of the peripheral cutting edges, wherein the end cutting edges are disposed with gashes at gash angles having different degrees depending on the helix angle, and wherein the gash angles are made larger when the helix angle is larger as compared to when the helix angle is smaller.

Effects of the Invention

In the variable lead end mill as described above, since the bottom diameter d of the plurality of the helix flutes is increased from the tool tip toward the shank, the breakage strength is improved and high-load or high-efficiency processing with deep cutting dimensions is enabled along with a longer tool life while higher tool rigidity suppresses flexural deformation, thereby further improving the machining accuracy.

In the second aspect of the invention, the lands of the peripheral cutting edges consist only of the peripheral relieving portions and therefore increase the flute width dimensions between the lands, i.e., the width dimensions of chip pockets so that the chip pockets with a sufficient size can be ensured regardless of the increase in the flute bottom diameter d, and a slope can be disposed on the flute bottom while suppressing clogging of chips, thereby improving the breakage strength.

In the third aspect of the invention, since the cross-sectional shape of the helix flute on the cutting-edge rear side is defined based on the tangential line C drawn from the heel of the land to the flute bottom circle Q such that the flute wall surface falls within the allowable range E defined with a width dimension of 0.05 D on each of the both sides of the tangential line C, the shape of the rake face can properly be maintained on the peripheral cutting edge side regardless of a difference or change in the flute width dimensions between the lands, and the shape of the lands consisting only of the peripheral relieving portions can properly be set on the cutting-edge rear side.

In the fourth aspect of the invention, since the flute bottom diameter d is continuously increased at the half taper angle within the range of 0.5 to 5.5 degrees in the axial direction, the breakage strength can properly be improved while avoiding the clogging of chips and the concentration of stress due to the increase in the flute bottom diameter d.

In the fifth aspect of the invention, since the edge thicknesses t of the plurality of the peripheral cutting edges are equal to each other within a variation range equal to or less than 0.04 D and are kept within the variation range over the whole axial length, variations in the strength of the peripheral cutting edges can be prevented regardless of a change in circumferential intervals of the peripheral cutting edges due to variable leads, thereby ensuring predetermined cutting edge strength.

In the sixth aspect of the invention, since the rake angles γ of the plurality of the peripheral cutting edges are equal to each other within a variation range equal to or less than 3 degrees and are kept within the variation range over the whole axial length, variations in cutting performance, wear resistance, and cutting edge strength can be prevented regardless of a change in circumferential intervals of the peripheral cutting edges due to variable leads.

In the seventh aspect of the invention, since the gash angles of the gashes of the end cutting edges are different depending on the helix angle of the peripheral cutting edges and the gash angles are made larger when the helix angle is larger as compared to when the helix angle is smaller, the chips of the end cutting edges are properly discharged regardless of a difference in the helix angle. Therefore, if the helix angle of the peripheral cutting edges is larger, a lift-up effect on chips (lift-up performance in the axial direction) is lower due to a smaller chip room of the end cutting edges and chips tend to stay; however, since the gash angles are made larger in the case of the larger helix angle, the chips of the end cutting edges are properly discharged via the gashes toward the outer circumference, suppressing the clogging of chips.

BRIEF DESCRIPTION OF THE DRAWINGS

FIG. 1(a) is a front view; FIG. 1(b) is a cross-sectional view orthogonal to an axial center O at a cutting portion; FIG. 1(c) is a bottom view from the tip side; and FIG. 1(d) is a longitudinal-section view of a helix flute depicted in parallel with the axial center O.

FIG. 3(a) is a cross-sectional view; and FIG.(b) is a partially cross-sectional view in which a rake face side is ground.

FIGS. 4(a) and 4(b) are diagrams for explaining test samples and test conditions when various tests are conducted by using products of the present invention and comparison products.

FIG. 6 is a diagram of a result when cuttings of the test condition Nos. 2 to 5 are performed by using the test sample Nos. 1, 3, and 6 of FIG. 4 to examine a cutting distance and a wear amount.

FIG. 10(a) is a cross-sectional view of a conventional shape; and FIG. 10(b) is a cross-sectional view of a shape acquired after the re-grinding.

MODE FOR CARRYING OUT THE INVENTION

Figure 1A:
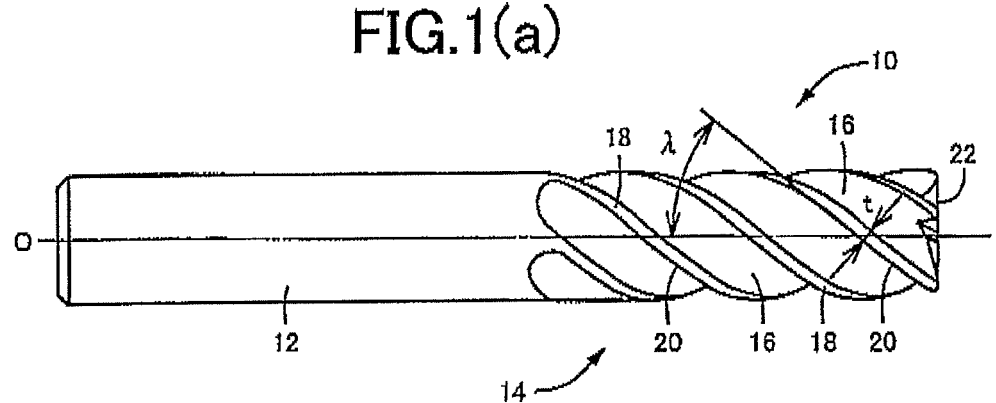
FIGS. 1(a), 1(b), 1(c), and 1(d) are diagrams of a variable lead end mill that is an example of the present invention.

Each of a plurality of peripheral cutting edges of a variable lead end mill of the present invention is disposed at a constant helix angle over the whole length. An angle difference in the helix angles of the plurality of the peripheral cutting edges is, for example, equal to or less than 10 degrees and desirably equal to or less than about 5 degrees. Although the helix angles of the plurality of the peripheral cutting edges may be all different from each other, at least one edge may be different. A portion of the peripheral cutting edges may be a straight cutting edge parallel to an axial center. The peripheral cutting edges may be not only smooth finishing cutting edges but also roughing cutting edges disposed with a wave shape, a nick, etc. The present invention is applicable to various end mills such as radius end mills having peripheral cutting edges with a tip corner rounded, square end mills having a square corner, and ball end mills having end cutting edges disposed on a spherical surface.

Although a flute bottom diameter d of a helix flute is increased from a tool tip toward a shank, for example, at a constant half taper angle within a range of 0.5 to 5.5 degrees in the axial direction, the half taper angle may change in a stepwise or continuous manner within the range of 0.5 to 5.5 degrees. Since a half taper angle greater than 5.5 degrees may cause breakage due to clogging of chips and a sufficient breakage strength improving effect cannot be acquired at less than 0.5 degrees, the range of 0.5 to 5.5 degrees is appropriate although the angle varies due to tool specifications such as a cutting edge length and machining conditions. When the first aspect of the invention is implemented, a parallel portion parallel to the axial center may be disposed in the middle and a half taper angle may be defined as an angle deviating from the range of 0.5 to 5.5 degrees depending on tool specifications such as a cutting edge length and machining conditions, and various other forms are also available. A plurality of the helix flutes is disposed such that the flute bottom diameters d become equal to each other at the same axial position.

In the second aspect of the invention, a land of a peripheral cutting edge is made up only of a peripheral relieving portion; however, in the other aspects of the present invention, the land may be disposed with a back clearance such as a second relief and various other forms are also available. If a land is made up only of a peripheral relieving portion, the land can be formed with one grinding by using a multiaxis (e.g., five-axis) processing machine in such a manlier that a posture of a grindstone grinding a helix flute is changed in the middle of flute machining, for example; however, the peripheral relieving portion may be ground by a plurality of times of grinding, and various other forms are also available.

In the fifth aspect of the invention, since edge thicknesses t of the plurality of the peripheral cutting edges are equal to each other within a variation range equal to or less than 0.04 D and are kept within the variation range over the whole axial length, the flute width of the helix flute is axially changed due to a difference in helix angle, and such an end mill can also be formed with one grinding by using a multiaxis (e.g., five-axis) processing machine in such a manner that a posture of a grindstone grinding a helix flute is changed in the middle of flute machining, for example. Adjustment may be made such that the edge thickness t becomes substantially constant with a plurality of times of grinding. The variation range equal to or less than 0.04 D can be acquired by machining within a variation range (tolerance) equal to or less than ±0.02 D relative to a target value, for example. Although a variation of the edge thickness t greater than 0.04 D may impair durability due to variations in strength of the peripheral cutting edges, the edge thickness t may vary greater than 0.04 D at the implementation of the other aspects of the invention.

In the sixth aspect of the invention, since rake angles γ of the plurality of the peripheral cutting edges are equal to each other within a variation range equal to or less than 3 degrees and are kept within the variation range over the whole axial length, the rake angles can be formed with one grinding by performing the grinding with a grindstone grinding a helix flute kept in a substantially constant posture during lead feed, for example; however, adjustment may be made as needed such that the rake angle γ becomes substantially constant with a plurality of times of grinding. The variation range equal to or less than 3 degrees can be acquired by machining within a variation range (tolerance) equal to or less than ±1.5 degrees relative to a target value, for example. Although a variation of the rake angles γ greater than 3 degrees may impair durability due to variations in cutting performance, wear resistance, and cutting edge strength, the rake angle γ may vary greater than 3 degrees at the implementation of the other aspects of the invention.

In the seventh aspect of the invention, gash angles of gashes disposed on end cutting edges are set to different degrees depending on a helix angle; however, at the implementation of the other aspects of the invention, the gashes may be disposed at a constant gash angle regardless of a difference in the helix angle. Although the gash angles are set to different degrees depending on a difference in the helix angle in the seventh aspect of the invention, all the gash angles may not be differentiated when the helix angle is different and, for example, if the helix angle changes in three stages, the gash angles may be changed only in two stages, and various other forms are also available.

Although the variable lead end mill of the present invention has continuously changing axial intervals of the plurality of the peripheral cutting edges, the variable lead end mill can be configured such that the peripheral cutting edges at the tool tip and the end cutting edges are positioned at regular angular intervals (also referred to as equal division). Alternatively, the variable lead end mill can be configured such that the peripheral cutting edges at the tool tip and the end cutting edges are positioned at predetermined irregular angular intervals (also referred to as unequal division).

EXAMPLE

An example of the present invention will now be described in detail with reference to the drawings.

FIG. 1 is a diagram of a variable lead end mill 10 that is an example of the present invention; (a) is a front view from a direction orthogonal to an axial center O; (b) is a cross-sectional view orthogonal to the axial center O at a cutting portion 14; (c) is a bottom view from the tip side; and (d) is a longitudinal-section view of a helix flute 16 depicted in parallel with the axial center O. FIG. 2 is a development view when a plurality of (in this example, five) peripheral cutting edges 20 of the variable lead end mill 10 are developed around the axial center O. The variable lead end mill 10 includes a shank 12 and the cutting portion 14 concentrically with the axial center O; the cutting portion 14 is divided into five lands 18 by disposing the five helix flutes 16; and one circumferential ends of the lands 18 are respectively disposed with the peripheral cutting edges 20 along the helix flutes 16. The variable lead end mill 10 of this example is integrally made of cemented carbide with a cutting diameter D of 12.7 mm and a cutting edge length L of about 31.8 mm (≈2.5 D) which is an axial length of the cutting portion 14, i.e., a flute length of the helix flute 16 excluding a flute raised portion, and has a surface of the cutting portion 14 coated with a hard film of TiAlN.

The variable lead end mill 10 is rotationally driven clockwise when viewed from the shank 12 to perform grinding (cutting machining) and all the peripheral cutting edges 20 are twisted clockwise in the same way as the cutting rotation direction. As apparent from the development view of FIG. 2, these peripheral cutting edges 20 are disposed with respective constant leads over the whole length; however, the leads, i.e., helix angles λ are different. FIG. 2 depicts the five peripheral cutting edges 20, the helix flutes 16, the lands 18, and the helix angles λ denoted by reference numerals including a to e for differentiation. Specifically, the width dimensions of the lands 18a to 18e are equal to each other and set substantially constant over the whole axial length and, since the lands 18a to 18e are disposed with constant width dimensions, the flute widths of the helix flutes 16a to 16e are continuously changed in the axial direction in accordance with a difference in the helix angles λ. Although all the helix angles λa to λe may be different from each other, the helix angle λa of the peripheral cutting edge 20a and the helix angle λd of the peripheral cutting edge 20d in this example are equal to each other and about 41 degrees; the helix angle λb of the peripheral cutting edge 20b is about 42 degrees; and the helix angle λc of the peripheral cutting edge 20c and the helix angle λe of the peripheral cutting edge 20e are equal to each other and about 43 degrees.

With regard to the angular intervals of the peripheral cutting edges 20a to 20e at the tool tip around the axial center O, an angle θa between the peripheral cutting edges 20e and 20a and an angle θd between the peripheral cutting edges 20c and 20d are equal to each other and about 83 degrees; an angle θb between the peripheral cutting edges 20a and 20b and an angle θe between the peripheral cutting edges 20d and 20e are equal to each other and about 62 degrees; and an angle θc between the peripheral cutting edges 20b and 20c is about 70 degrees. Therefore, these peripheral cutting edges 20 are disposed with end cutting edges 22 in a continuous manner and these end cutting edges 22 are unequally divided at different intervals around the axial center O.

The end cutting edges 22 are disposed with gashes 24 to make up respective rake faces, and the gash angles are set to different degrees depending on the helix angle λ such that the gash angle is made larger when the helix angle λ is larger as compared to when the helix angle λ is smaller. Specifically, the gash angle of about 15 degrees is formed by the gashes 24 of the end cutting edges 22 disposed continuously from the peripheral cutting edges 20a and 20d having the relatively smaller helix angle λ, and the gash angle of about 20 degrees is formed by the gashes 24 of the other end cutting edges 22, i.e., the end cutting edges 22 disposed continuously from the peripheral cutting edges 20b, 20c, and 20e. The gash angle is a slope angle from the direction orthogonal to the axial center O to the axial direction of the gash 24 and, when the gash angle is larger, chips more easily flow toward the outer circumference. Therefore, if the helix angle λ of the peripheral cutting edges 20 is larger, a lift-up effect on chips (lift-up performance in the axial direction) is lower due to a smaller chip room of the end cutting edges 22 and chips tend to stay; however, since the larger gash angles are defined by the gashes 24 of the end cutting edges 22 disposed continuously from the peripheral cutting edges 20b, 20c, and 20e having the larger helix angle λ, the chips of the end cutting edges 22 are properly discharged via the gashes 24 toward the outer circumference, suppressing the clogging of chips.

Figure 1B:
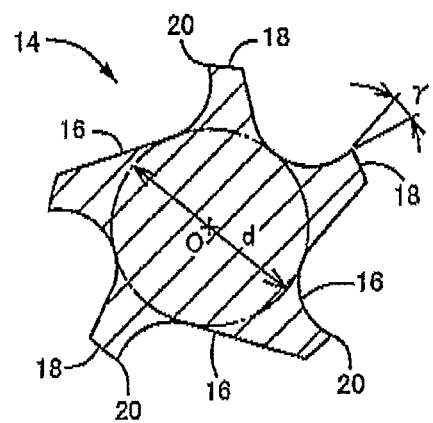
Figure 1C:
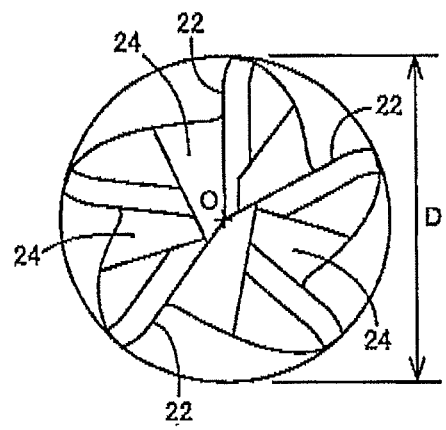
Figure 1D:
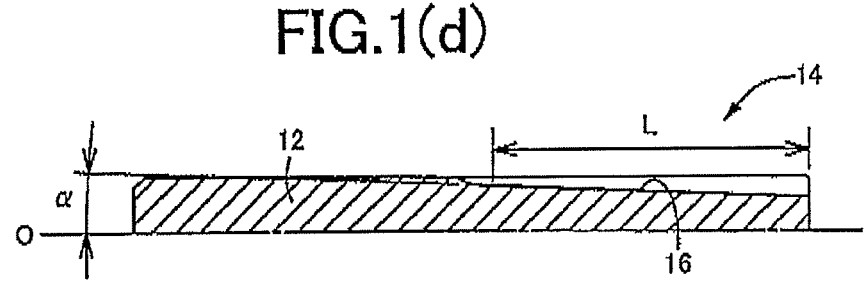
Figure 2:
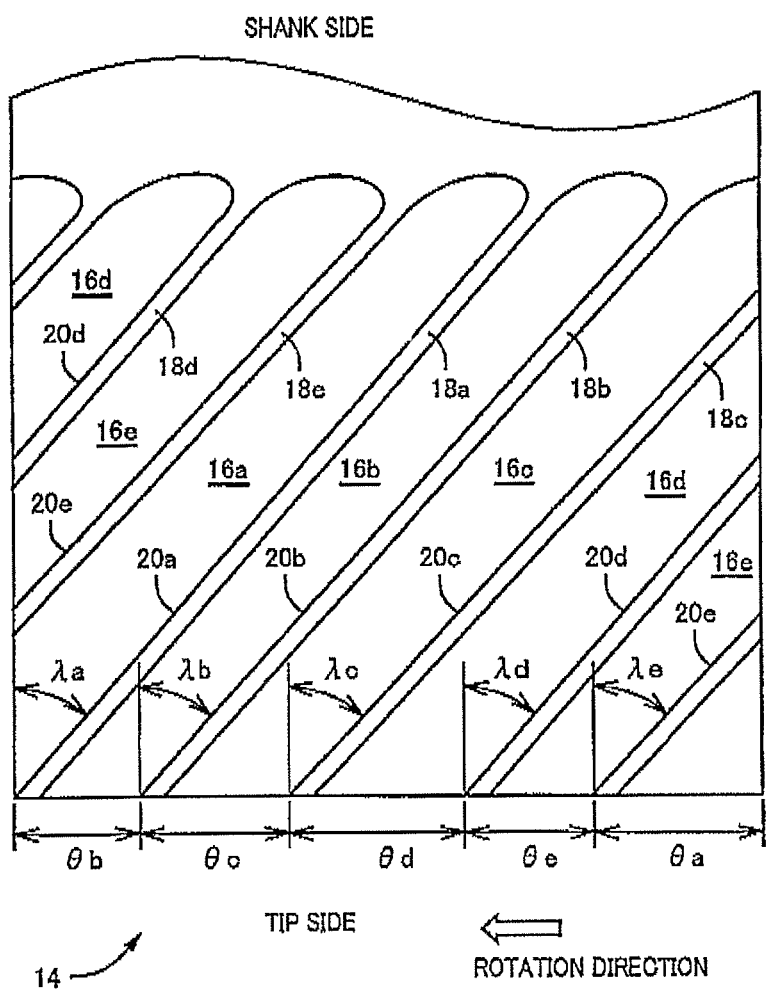
FIG. 2 is a development view when peripheral cutting edges of the variable lead end mill of FIG. 1 are developed.

Although the helix flutes 16 have the width dimensions continuously changing toward the axial direction, flute bottom diameters d of the plurality of the helix flutes 16 are equal to each other at the same axial position as depicted in FIG. 1(b). As apparent from FIG. 1(d), the bottom diameters d are continuously increased at a constant half taper angle α in the axial direction from the tool tip toward the shank 12. The half taper angle α is appropriately defined within a range of 0.5 to 5.5 degrees and is about 1.5 degrees in this example. The flute bottom diameter d at the tool tip, i.e., a core diameter, is about 8.26 mm (≈0.65 D) in this example.

As apparent from FIG. 1(b), the land 18 is made up only of a peripheral, relieving portion (corresponding to a primary flank) with an edge thickness t (see FIG. 1(a)), i.e., a width dimension of the land 18 in the direction orthogonal to the cutting edge, of about 0.95 mm, and the edge thicknesses t of a plurality of the lands 18 are equal to each other within a variation range (tolerance) equal to or less than ±0.02 D (0.02×12.7≈0.25 mm in this example) and are kept within the variation range over the whole axial length. Rake angles γ of the plurality of the peripheral cutting edges 20 are about 2 degrees and equal to each other within a variation range (tolerance) equal to or less than ±1.5 degrees and are kept within the variation range over the whole axial length.

Figure 3A:
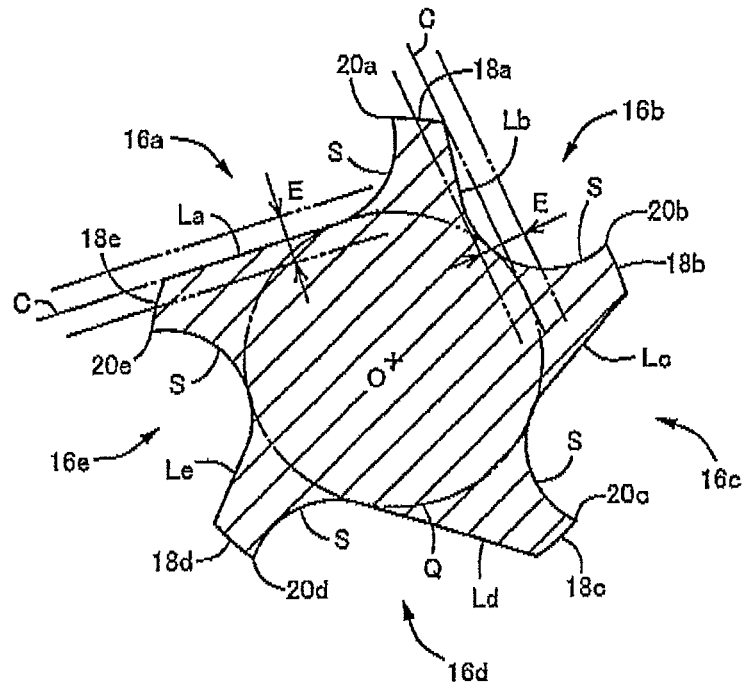
FIGS. 3(a) and 3(b) are diagrams for explaining a cross-sectional shape of flutes orthogonal to the axial center 0 of the variable lead end mill of FIG. 1.
Figure 3B:
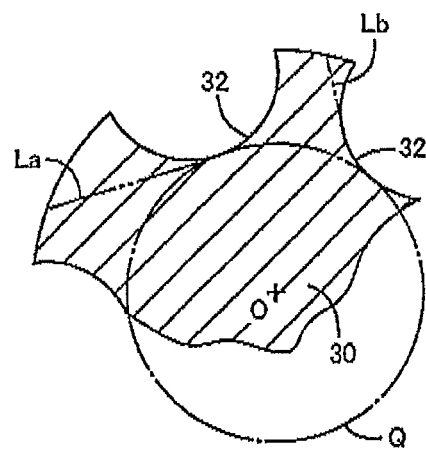

FIG. 3(a) is a diagram for explaining an example of a cross-sectional shape of the helix flutes 16a to 16e orthogonal to the axial center O from the peripheral cutting edges 20a to 20e to heels of the lands 18a to 18e, and a common concave curve (e.g., arc) S is set that passes through a flute bottom circle Q passing through flute bottoms of the plurality of the helix flutes 16a to 16e and edges of the peripheral cutting edges 20a to 20e and that forms the rake angle γ of a predetermined degree. On the cutting-edge rear side, based on a tangential line C drawn from the heel of each of the lands 18a to 18e to the flute bottom circle Q, straight lines La to Le smoothly connected from the heel to the concave curve S are defined such that a flute wall surface falls within an allowable range E defined with a width dimension of 0.05 D (0.05× 12.7≈0.64 mm in this example) on each of the both sides of the tangential line C, and the cross-sectional shapes of the respective helix flutes 16a to 16e are defined by the straight lines La to Le and the concave curve S. Although the allowable range E is depicted for the helix flutes 16a and 16b in FIG. 3(a), the cross-sectional shapes are defined within the same allowable range E for the other helix flutes 16c to 16e. Although the helix flutes 16a to 16e as described above can be formed by performing grinding more than once, the helix flutes 16a to 16e can be formed with one grinding by using a multiaxis (e.g., five-axis) processing machine through relative movement along the helix flutes 16a to 16e while the position and posture of the grindstone are changed, depending on a flute shape. FIG. 3(b) depicts an example when a flute is ground by a plurality of times of grinding, in which a rake face groove 32 corresponding to the concave curve S is ground in a bar-shaped material 30, and the helix flutes 16 with desired cross-sectional shapes are acquired by performing the grinding along the straight lines La to Le as indicated by dashed-two dotted lines. The cross-sectional shapes of the helix flutes 16a to 16e may be prescribed by the cross sections orthogonal to edges of the peripheral cutting edges 20a to 20e.

In the variable lead end mill 10 of this example as described above, since the bottom diameter d of the plurality of the helix flutes 16 is increased from the tool tip toward the shank 12, the breakage strength is improved and high-load or high-efficiency processing with deep cutting dimensions is enabled along with a longer tool life while higher tool rigidity suppresses flexural deformation, thereby further improving the machining accuracy.

The lands 18 of the peripheral cutting edges 20 consist only of the peripheral relieving portions and therefore increase the flute width dimensions of the helix flutes 16 between the lands 18, i.e., the width dimensions of chip pockets so that the chip pockets with a sufficient size can be ensured regardless of the increase in the flute bottom diameter d, and a slope can be disposed on the flute bottom while suppressing clogging of chips, thereby improving the breakage strength.

Since the cross-sectional shape of the helix flutes 16 on the cutting-edge rear side is defined based on the tangential line C drawn from the heel of each of the lands 18 to the flute bottom circle Q such that the flute wall surface falls within the allowable range E defined with a width dimension of 0.05 D on each of the both sides of the tangential line C, the shape of the rake face (concave curve 8) can properly be maintained on the peripheral cutting edge 20 side regardless of a difference or change in the flute width dimensions between the lands 18, and the shape of the lands 18 consisting only of the peripheral relieving portions can properly be set on the cutting-edge rear side.

Since the flute bottom diameter d is continuously increased at the constant half taper angle α within the range of 0.5 to 5.5 degrees in the axial direction, the breakage strength can properly be improved while avoiding the clogging of chips and the concentration of stress due to the increase in the flute bottom diameter d.

Since the edge thicknesses t of the plurality of the peripheral cutting edges 20 are equal to each other within a variation range equal to or less than ±0.02 D relative to the target value (0.95 mm) and are kept within the variation range over the whole axial length, variations in the strength of the peripheral cutting edges 20 can be prevented regardless of a change in circumferential intervals of the peripheral cutting edges 20 due to variable leads, thereby ensuring predetermined cutting edge strength.

Since the rake angles γ of the plurality of the peripheral cutting edges 20 are equal to each other within a variation range equal to or less than ±1.5 degrees relative to the target value (2 degrees) and are kept within the variation range over the whole axial length, variations in cutting performance, wear resistance, and cutting edge strength can be prevented regardless of a change in circumferential intervals of the peripheral cutting edges 20 due to variable leads.

Since the gash angles of the gashes 24 of the end cutting edges 22 are different depending on the helix angle λ of the peripheral cutting edges 20 and the gash angles are made larger when the helix angle λ is larger as compared to when the helix angle λ is smaller, the chips of the end cutting edges 22 are properly discharged regardless of a difference in the helix angle λ.

Figure 10A:
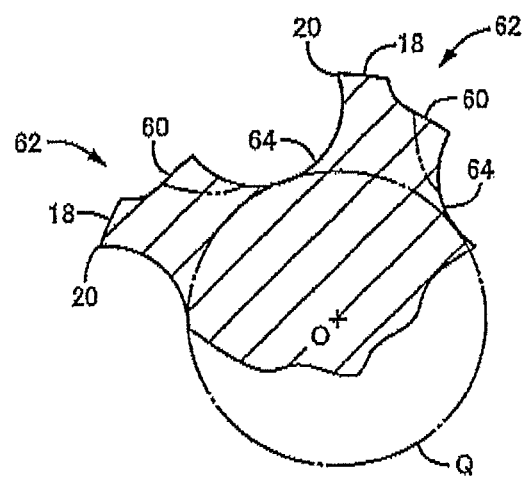
FIGS. 10(a) and 10(b) are diagrams for explaining further example of the present invention and depicts an example in which a conventional back clearance portion is removed by re-grinding.

FIG. 4 is a diagram for explaining test samples and test conditions when various tests are conducted by using products of the present invention and comparison products. Test sample Nos. 1 and 4 of (a) are conventional products with variable leads having the half taper angle α=0 degrees and disposed with a land 62 having a back clearance 60 and a helix flute 64 having a constant flute width as depicted in FIG. 10(a); test sample Nos. 2 and 5 are comparison products different only in that the half taper angle α is 0 degrees as compared to the variable lead end mill 10; and test sample Nos. 3 and 6 are the products of the present invention configured in the same way as the variable lead end mill 10. Both four-flute and five-flute products have a cutting diameter D=12.7 mm and a cutting edge length L=31.8 mm (≈2.5 D). With regard to the test conditions of FIG. 4(b), "pocket" cutting is side-face cutting performed from the center toward the outer circumference along a square spiral line, and "ap" and "ae" of a "depth of cut" field denote an axial depth of cut and a radial depth of cut, respectively. A "cutting area" of a "remark" field refers to a test for examining a cuttable area (limit) of the axial depth of cut ap and "durability" refers to a test for examining a wear amount corresponding to the cutting distance until the tool life or a predetermined cutting distance.

Figure 5:
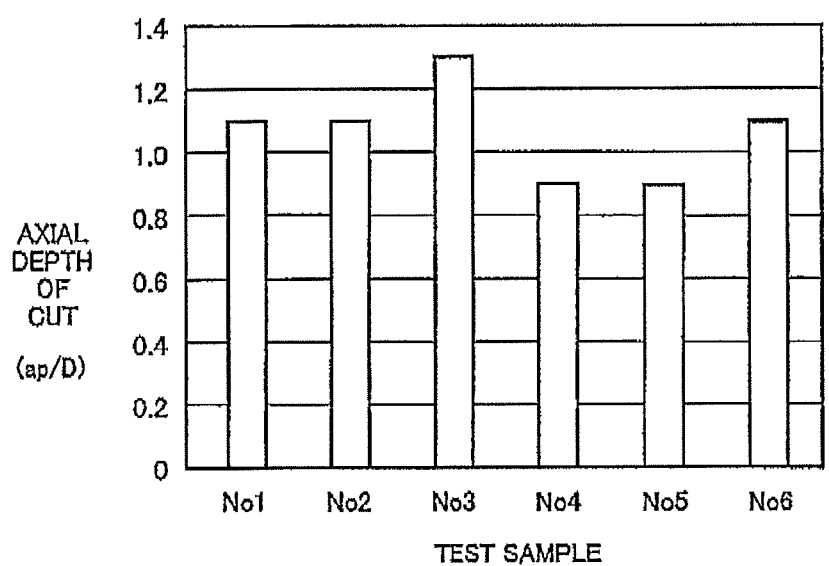
FIG. 5 is a diagram depicting a result of examination of limit values of an axial depth of cut at which flute cutting of the test condition No. 1 can be performed by using the test sample Nos. 1 to 6 of FIG. 4.

FIG. 5 depicts a result of examination of limit values of the axial depth of cut ap at which the flute cutting of the test condition No. 1 can be performed by using the test sample Nos. 1 to 6 of FIG. 4, i.e., the axial depth of cut ap immediately before tool breakage when the axial depth of cut ap is increased from 0.5 D by 0.1 D. As apparent from FIG. 5, the test sample Nos. 3 and 6, which are the products of the present invention, increase the axial depth of cut ap by about 0.2 D as compared to the conventional products of the test sample Nos. 1 and 4 and the comparison products of the test sample Nos. 2 and 5 and it can be known that the breakage strength is improved by tapering the flute bottom diameter d rather than simply increasing the flute width to only make chip pockets larger.

FIG. 6 depicts a result of examination of a cutting distance and a wear amount when the durability tests of the test condition Nos. 2 to 5 are performed by using the test sample Nos. 1, 3, and 6. The cutting distance of the test condition No. 2 is a cutting distance until an average of wear amounts (corresponding to peripheral flank wear widths) of a plurality of the peripheral cutting edges 20 reaches 0.3 mm, and the wear amount of the test condition Nos. 3 to 5 is a wear amount (corresponding to a peripheral flank wear width) when a cutting distance is 3.2 m. A percentage in parentheses is a value when the conventional product of the test sample No. 1 is assumed to be 100% and represents a degree of reduction (inverse number) from the test sample No. 1 in the case of a wear amount. From this result, in the test condition Nos. 2 and 3 associated with a relatively larger load, the test sample Nos. 3 and 6, which are the products of the present invention, have the durability improved by 34% to 73% as compared to the conventional product of the test sample No. 1. Particularly excellent durability improvement effect is acquired from the five-flute test sample No. 6. In the test condition Nos. 4 and 5 associated with a relatively smaller load, the test sample No. 3, which is the product of the present invention, has the durability improved by 16% to 18% as compared to the conventional product of the test sample No. 1.

Figure 7:
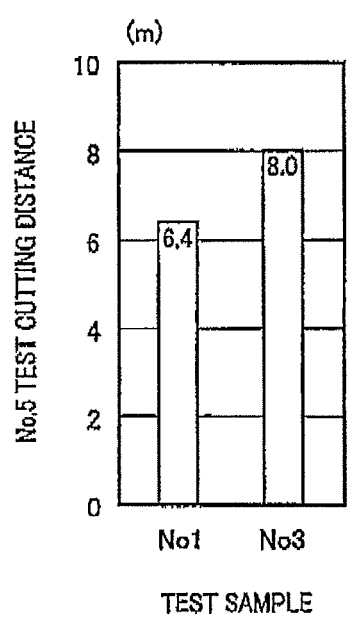
FIG. 7 is a diagram of a result when side-face cutting of the test condition No. 5 is performed by using the test sample Nos. 1 and 3 of FIG. 4 to examine a cutting distance.

FIG. 7 is a diagram of a result when the side-face cutting of the test condition No. 5 is performed by using the test sample Nos. 1 and 3 of FIG. 4 to examine a cutting distance until an average of wear amounts of the peripheral cutting edges 20 reaches 0.3 mm. In this case, the test sample No. 3, which is the product of the present invention, has the durability improved by about 25% as compared to the conventional product of the test sample No. 1.

FIG. 8 depicts a result of examination of effect of the half taper angle α of the axial slope of the flute bottom of the helix flute 16 on the flute machining performance and the side-face machining performance, and seven types of test samples were prepared by setting the half taper angle α to 0, 0.5, 1.5, 3, 4, 5, and 6 degrees in the variable lead end mills 10 of the example to examine the limit values of the axial depth of cut ap at which the flute cutting of the test condition No. 1 can be performed, i.e., the axial depth of cut ap immediately before tool breakage when the axial depth of cut ap is increased from 0.5 D by 0.1 D, in the flute machining performance test of (a).

Figure 8A:
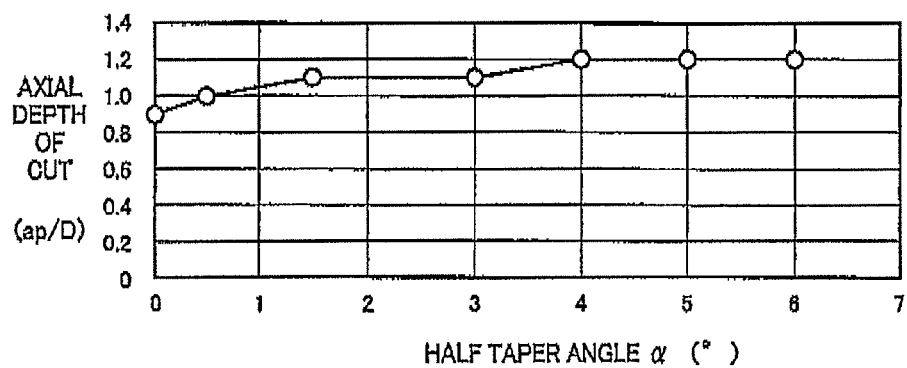
FIGS. 8(a) and 8(b) are diagrams depicting a result of examination of effect of a half taper angle α on flute machining performance and side-face machining performance.
Figure 8B:
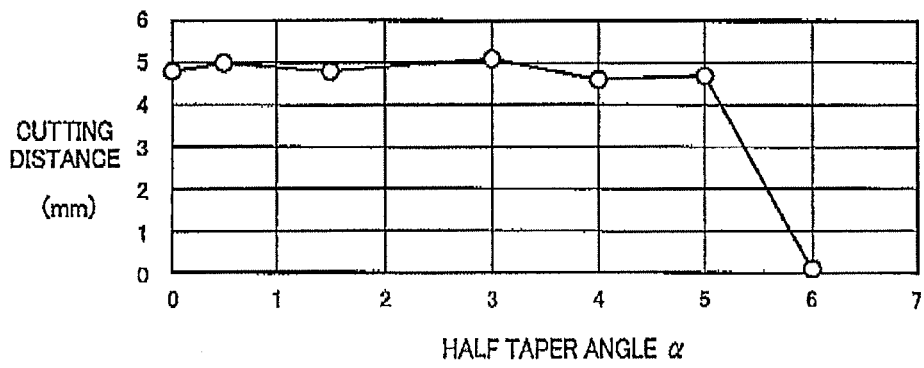

From the result of FIG. 8(a), it can be known that if the half taper angle α is set to 0.5 degrees or greater, the breakage strength is improved as compared to the comparison product having α=0. In the side-face machining performance test of (b), the side-face cutting is performed under the machining condition different only in that the axial depth of cut ap is set to 31.8 mm (≈2.5 D) in the test condition No. 5 to examine a cutting distance until an average of wear amounts of the peripheral cutting edges 20 reaches 0.3 mm. In FIG. 8(b), in the case of α=6 degrees, breakage occurs at about 0.1 m due to clogging of chips. From the results of (a) and (b) of FIG. 8, it is considered that a range of 0.5 to 5.5 degrees is appropriate for the half taper angle α of the slope of the flute bottom.

Other examples of the present invention will be described. In the following examples, the portions substantially common with the example are denoted by the same reference numerals and will not be described in detail.

Figure 9:
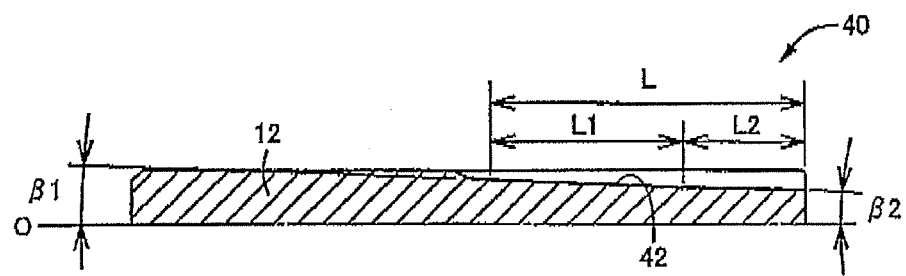
FIG. 9 is a diagram for explaining another example of the present invention and is a longitudinal-section view corresponding to FIG. 1(d).

FIG. 9 is a longitudinal-section view corresponding to (d) of FIG. 1 and depicts the case that a half taper angle of an axial slope of a flute bottom of a helix flute 42 disposed in a cutting portion 40 is changed in the middle of the cutting edge length L. Therefore, a half taper angle β1 of a shank-side part L1 of the cutting edge length L is different from a half taper angle β2 of a tip-side part L2, and the both angles are set within a range of 0.5 to 5.5 degrees such that β1<β2 is satisfied, and are connected in a convex arc shape such that the half taper angle smoothly changes at the boundary portion thereof. The same effects as the example are acquired in this example.

Figure 10B:
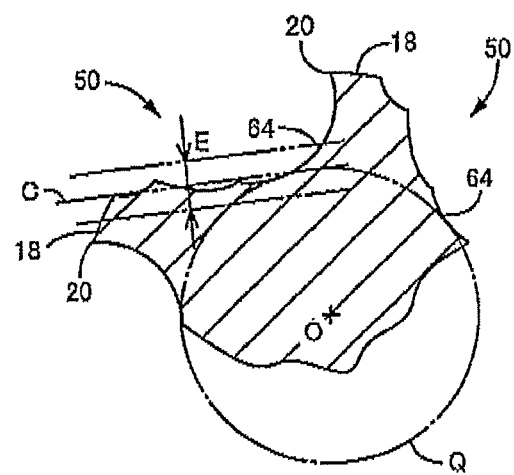

FIG. 10 is a diagram for explaining further example of the present invention and depicts the case that a conventional back clearance portion is removed by re-grinding to form the land 18 consisting only of a peripheral relieving portion and to form a helix flute 50 with a larger flute width. FIG. 10(a) is a cross-sectional view of a conventional shape having a land 62 with a back clearance 60 such as a second relief and a helix flute 64 with a constant flute width dimension formed in the same way as the rake face groove 32 of FIG. 3(b), and the helix flute 50 in the object shape depicted in (b) is acquired by grinding and removing the portion of the back clearance 60 as indicated by a dashed-two dotted line, for example. This helix flute 50 is formed based on the tangential line C drawn from the heel of the land 18 to the flute bottom circle Q such that the flute wall surface falls within the allowable range E defined with a width dimension of 0.05 D on each of the both sides of the tangential line C. Although the flute wall surfaces are unevenly formed in this case, the unevenness is equal to or less than 0.1 D and has little impact and, since the helix flute 50 with a larger flute width is disposed, the same effects as the example are acquired such as maintaining good chip discharge performance regardless of an increase in the flute bottom diameter d.

Although the examples of the present invention have been described in detail with reference to the drawings, these examples are merely an embodiment and the present invention may be implemented in variously modified and improved forms based on the knowledge of those skilled in the art.

NOMENCLATURE OF ELEMENTS

10: variable lead end mill 16, 16a to 16e, 42, 50: helix flute 13, 18a to 18e: land 20, 20a to 20e: peripheral cutting edge 22: end cutting edges 24: gash O: axial center D): cutting diameter d: flute bottom diameter λ, λa to λe; helix angle γ: rake angle t: edge thickness α, β1, β2: half taper angle Q: flute bottom circle C: tangential line E: allowable range

The invention claimed is:

1. A variable lead end mill having a plurality of peripheral cutting edges with different helix angles,
   the variable lead end mill having a flute bottom diameter of a plurality of helix flutes making up rake faces of the plurality of the peripheral cutting edges, the flute bottom diameter increasing in an axial direction from a tool tip toward a shank, and
   a cross-sectional shape of the helix flute orthogonal to an axial center on a cutting-edge rear side leading to a heel of a land of the peripheral cutting edge being defined based on a tangential line drawn from the heel of the land to a flute bottom circle passing though flute bottoms of the plurality of the helix flutes such that a flute wall surface falls within an allowable range defined with a width dimension of 0.05 D on each of both sides of the tangential line wherein D is a cutting diameter of the variable lead end mill.

2. The variable lead end mill of claim 1, wherein
   the land consists only of a relief.

3. The variable lead end mill of claim 1, wherein
   the flute bottom diameter is continuously increased at a half taper angle defined to be within a range of 0.5 to 5.5 degrees in the axial direction.

4. The variable lead end mill of claim 2, wherein
   the flute bottom diameter is continuously increased at a half taper angle defined to be within a range of 0.5 to 5.5 degrees in the axial direction.

5. The variable lead end mill of claim 2, wherein
   edge thicknesses are width dimensions of lands in a direction orthogonal to edges of the plurality of the peripheral cutting edges and are equal to each other within a variation range equal to or less than 0.04 D and are kept within the variation range over the whole axial length, wherein D is the cutting diameter of the variable lead end mill.

6. The variable lead end mill of claim 1, wherein
   rake angles of the plurality of the peripheral cutting edges are equal to each other within a variation range equal to or less than 3 degrees and are kept within the variation range over the whole axial length.

7. The variable lead end mill of claim 2, wherein
   rake angles of the plurality of the peripheral cutting edges are equal to each other within a variation range equal to or less than 3 degrees and are kept within the variation range over the whole axial length.

8. The variable lead end mill of claim 3, wherein
   rake angles of the plurality of the peripheral cutting edges are equal to each other within a variation range equal to or less than 3 degrees and are kept within the variation range over the whole axial length.

9. The variable lead end mill of claim 5, wherein
   rake angles of the plurality of the peripheral cutting edges are equal to each other within a variation range equal to or less than 3 degrees and are kept within the variation range over the whole axial length.

10. The variable lead end mill of claim 1, wherein
    the variable lead end mill has a plurality of end cutting edges continuously from the plurality of the peripheral cutting edges, wherein the end cutting edges are disposed with gashes.

11. The variable lead end mill of claim 1, wherein
    the variable lead end mill has a plurality of end cutting edges continuously from the plurality of the peripheral cutting edges, wherein the end cutting edges are disposed with gashes.

12. The variable lead end mill of claim 3, wherein
    the variable lead end mill has a plurality of end cutting edges continuously from the plurality of the peripheral cutting edges, wherein the end cutting edges are disposed with gashes.

13. The variable lead end mill of claim 5, wherein
    the variable lead end mill has a plurality of end cutting edges continuously from the plurality of the peripheral cutting edges, wherein the end cutting edges are disposed with gashes.

14. The variable lead end mill of claim 6, wherein
    the variable lead end mill has a plurality of end cutting edges continuously from the plurality of the peripheral cutting edges, wherein the end cutting edges are disposed with gashes.

* * * * *